United States Patent
Chuang et al.

(10) Patent No.: US 11,809,847 B2
(45) Date of Patent: Nov. 7, 2023

(54) HARDCODED STRING DETECTION

(71) Applicant: International Business Machines Corporation, Armonk, NY (US)

(72) Inventors: Chia Hsin Chuang, New Taipei (TW); Hsinchi Chang, Taipei (TW); Fan Yang, Beijing (CN); Shun Jie Yu, Ningbo (CN); Yi-Chun Chen, Taipei (TW); Chao Yuan Huang, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 17/655,002

(22) Filed: Mar. 16, 2022

(65) Prior Publication Data

US 2023/0297347 A1   Sep. 21, 2023

(51) Int. Cl.
  *G06F 8/40*   (2018.01)
  *G06F 16/33*  (2019.01)

(52) U.S. Cl.
  CPC ............ *G06F 8/40* (2013.01); *G06F 16/3344* (2019.01)

(58) Field of Classification Search
  USPC ........................................................ 717/136
  See application file for complete search history.

(56) References Cited

U.S. PATENT DOCUMENTS

| | | | |
|---|---|---|---|
| 9,804,862 B2 * | 10/2017 | Dmytryshyn | G06F 9/454 |
| 10,078,504 B1 * | 9/2018 | Franovic | G06F 8/60 |
| 2008/0189682 A1 * | 8/2008 | Rude | G06F 40/10 |
| | | | 717/113 |
| 2010/0306747 A1 * | 12/2010 | Pawlowsky | G06F 9/454 |
| | | | 717/137 |
| 2017/0212829 A1 | 7/2017 | Bales | |

(Continued)

FOREIGN PATENT DOCUMENTS

| | | |
|---|---|---|
| CN | 101017458 A | 8/2007 |
| CN | 111399848 A | 7/2020 |
| JP | 4143661 B2 | 9/2008 |

OTHER PUBLICATIONS

Wang, "Knowledge Graph Embedding by Translating on Hyperplanes", 2014, Association for the Advancement of Artificial Intelligence (Year: 2014).*

(Continued)

*Primary Examiner* — Hossain M Morshed
(74) *Attorney, Agent, or Firm* — Randy Tejeda (57) ABSTRACT

One or more computer processors identify a string within source code associated with a program integrated interface (PII). The one or more computer processors compare the identified string to a string entry comprised in a PII dictionary. The one or more computer processors, responsive to a match between the identified string and the string entry in the PII dictionary, classify the identified string as translatable or non-translatable based on a classification associated with the string entry. The one or more computer processors, responsive to a non-match between the identified string and the string entry in the PII dictionary, classify the identified string as translatable or non-translatable utilizing a hyperplane model trained with a margin (C) derived from unlimited search. The one or more computer processors, responsive to a classified translatable string, translate the classified translatable string.

20 Claims, 3 Drawing Sheets

(56) References Cited

U.S. PATENT DOCUMENTS

2018/0101464 A1* 4/2018 Fan .................. G06F 9/454
2020/0159552 A1* 5/2020 Bodin ............... G06F 9/454
2020/0401502 A1* 12/2020 Zang ................ G06F 8/75

OTHER PUBLICATIONS

Sanz, "On the Automatic Categorisation of Android Applications", 2012, IEEE (Year: 2012).*
"Lingobit Extractor", Copyright @ 2003-2020 Lingobit Technologies, 2 pages, <http://www.lingobit.com/products/hardcoded_string_extraction.html>.
Wang et al., "Locating Need-to-Translate Constant Strings for Software Internationalization", Downloaded Jan. 7, 2022, ACM 978-1-60558-791-2/10/11, 10 pages.

* cited by examiner

HARDCODED STRING DETECTION

BACKGROUND

The present invention relates generally to the field of machine learning, and more particularly to string classification within program integrated interfaces.

Internationalization and localization are means of adapting computer software to different languages, regional peculiarities and technical requirements of a target locale. Internationalization is the process of designing a software application so that it can be adapted to various languages and regions without engineering changes. Localization is the process of adapting internationalized software for a specific region or language by translating text and adding locale-specific components.

Machine learning (ML) is the scientific study of algorithms and statistical models that computer systems use to perform a specific task without using explicit instructions, relying on patterns and inference instead. Machine learning is seen as a subset of artificial intelligence. Machine learning algorithms build a mathematical model based on sample data, known as training data, in order to make predictions or decisions without being explicitly programmed to perform the task. Machine learning algorithms are used in a wide variety of applications, such as email filtering and computer vision, where it is difficult or infeasible to develop a conventional algorithm for effectively performing the task.

SUMMARY

Embodiments of the present invention disclose a computer-implemented method, a computer program product, and a system. The computer-implemented method includes one or more computer processers identifying a string within source code associated with a program integrated interface (PII). The one or more computer processers compare the identified string to a string entry comprised in a PII dictionary. The one or more computer processers, responsive to a match between the identified string and the string entry in the PII dictionary, classify the identified string as translatable or non-translatable based on a classification associated with the string entry. The one or more computer processers, responsive to a non-match between the identified string and the string entry in the PII dictionary, classify the identified string as translatable or non-translatable utilizing a hyperplane model trained with a margin (C) derived from unlimited search. The one or more computer processers, responsive to a classified translatable string, translate the classified translatable string.

DETAILED DESCRIPTION

Software globalization (i.e., localization) has increased the demand for software availability throughout the world, requiring extensive translations across a plurality of distinct languages. One of the key tasks of software globalization is identifying and extracting translatable strings from source code so that applicable strings can be subsequently translated to different languages. In instances where strings are incorrectly identified, said strings are presented in corresponding graphical user interfaces (GUI) as a default language (e.g., English) or incorrect language, where said strings are "hardcoded". The "hardcoded" string issue is detected by observing default language strings (i.e., Translatability Test) on the GUI of a development or production build, however, said observation typically occurs after a completed build, requiring a human tester to iterate through all presented and possible GUI strings and messages in order to verify the strings are not "hardcoded" (e.g., translated and presented in the correct or appropriate language). Utilizing traditional human-in-the-loop system requires substantial training and equipment that significantly adds to the cost and complexity of software globalization projects and associated tasks. Furthermore, current string translation systems (e.g., static code scanning) are prone to false positives and inaccurate translations, leading to costly code corrections and delays in production or deployment.

Embodiments of the present invention utilize a two phase system to improve string identification and translation accuracy in software globalization systems. Embodiments of the present invention vectorize program integrated interfaces (PII) and classify each comprised GUI string as translatable or not translatable. Embodiments of the present invention utilize "unlimited" search to improve the accuracy of subsequently trained string identification and translation models. Embodiments of the present invention reduce false positives and errors with GUI presentation, thus reducing the cost and computational requirements needed to identify and translate "hardcoded" strings within large source code sets. Embodiments of the present invention detect "hardcoded" strings from source code or files directly. Embodiments of the present invention have demonstrated a reduction rate of false positive "hardcoded" strings; from 80% to 6%, which reduces the total amount of computational resources required for dynamic software translation. Embodiments of the present invention provide reliable and efficient string identification in code while providing dynamic translation abilities therefore enhancing software globalization systems. Implementation of embodiments of the invention may take a variety of forms, and exemplary implementation details are discussed subsequently with reference to the Figures.

The present invention will now be described in detail with reference to the Figures.

Figure 1:
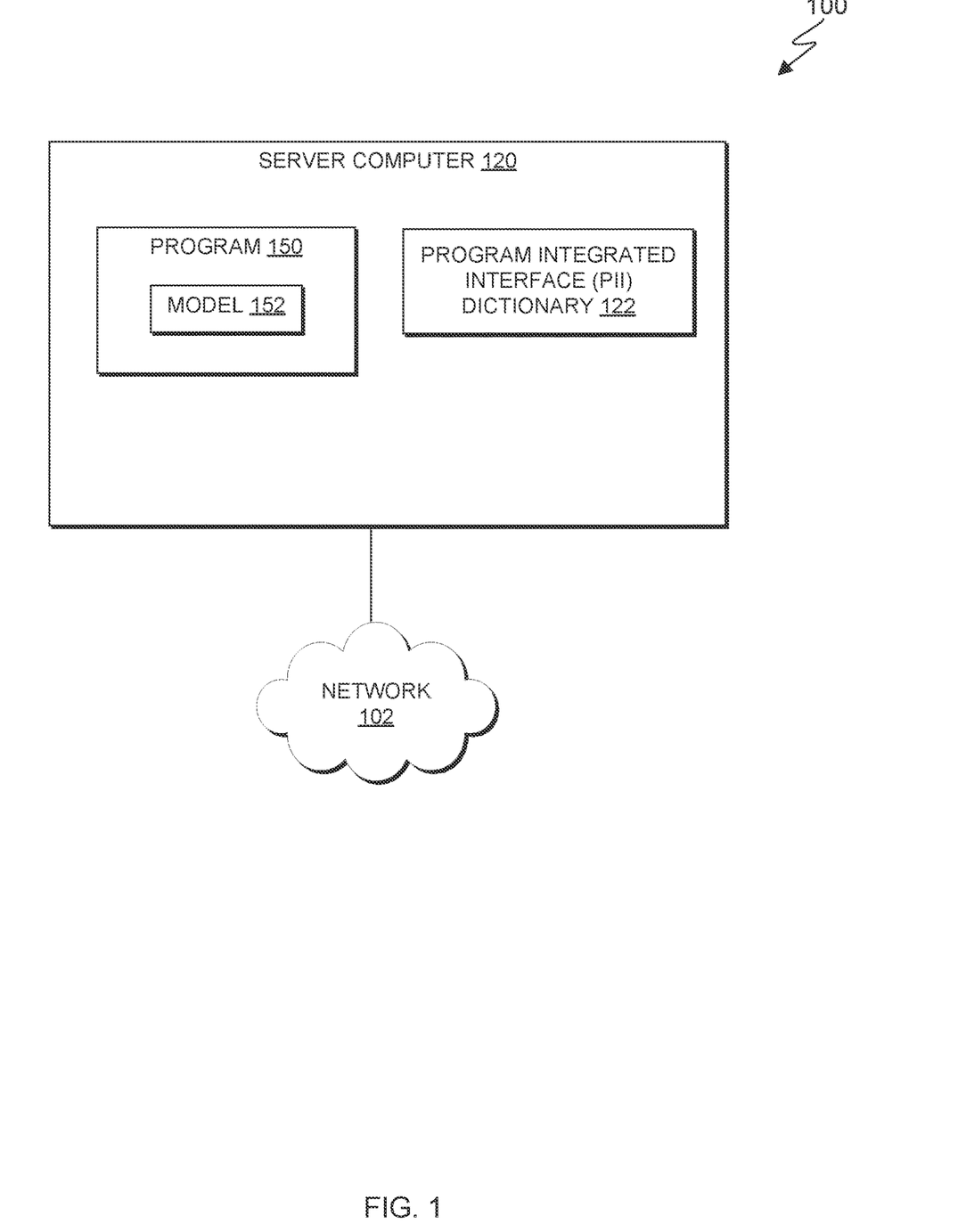
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes program integrated interface dictionary 122 and program 150. In other embodiments, server computer 120 may contain other applications, databases, programs, etc. which have not been depicted in computational environment 100. Server computer 120 may include internal and external hardware components, as depicted and described in further detail with respect to FIG. 3.

Program integrated interface (PII) dictionary 122 is a repository for data used by program 150. In the depicted embodiment, PII dictionary 122 resides on server computer 120. In another embodiment, PII dictionary 122 may reside elsewhere within computational environment 100 provided program 150 has access to PII dictionary 122. A database is an organized collection of data. PII dictionary 122 can be implemented with any type of storage device capable of storing data and configuration files that can be accessed and utilized by program 150, such as a database server, a hard disk drive, or a flash memory. In an embodiment, PII dictionary 122 stores data used by program 150, such as historical string classifications (i.e., positive and negative) with associated metadata (e.g., XML Localization Interchange File Format (XLIFF)) and historical translations.

Program 150 is a program for identifying translatable strings within program integrated interfaces. In various embodiments, program 150 may implement the following steps: identify a string within source code associated with a program integrated interface (PII); compare the identified string to a string entry comprised in a PII dictionary; responsive to a match between the identified string and the string entry in the PII dictionary, classify the identified string as translatable or non-translatable based on a classification associated with the string entry; responsive to a non-match between the identified string and the string entry in the PII dictionary, classify the identified string as translatable or non-translatable utilizing a hyperplane model trained with a margin (C) derived from unlimited search; and responsive to a classified translatable string, translate the classified translatable string. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computational environment 100. In the depicted embodiment, program 150 includes model 152. Program 150 is depicted and described in further detail with respect to FIG. 2.

Model 152 is representative of a model utilizing deep learning techniques to train, calculate weights, ingest inputs, and output a plurality of solution vectors representing translatable strings within a PII vector space. In an embodiment, model 152 is comprised of any combination of deep learning model, technique, and algorithm (e.g., decision trees, Naive Bayes classification, support vector machines for classification problems, random forest for classification and regression, linear regression, least squares regression, logistic regression). In an embodiment, model 152 utilizes transferrable neural networks algorithms and models (e.g., long short-term memory (LSTM), deep stacking network (DSN), deep belief network (DBN), convolutional neural networks (CNN), compound hierarchical deep models, etc.) that can be trained with supervised or unsupervised methods. In the depicted embodiment, model 152 is a support vector machine (SVM) or any machine learning model that utilizes a hyperplane for classification. The training of model 152 is depicted and described in further detail with respect to FIG. 2.

The present invention may contain various accessible data sources, such as PII dictionary 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
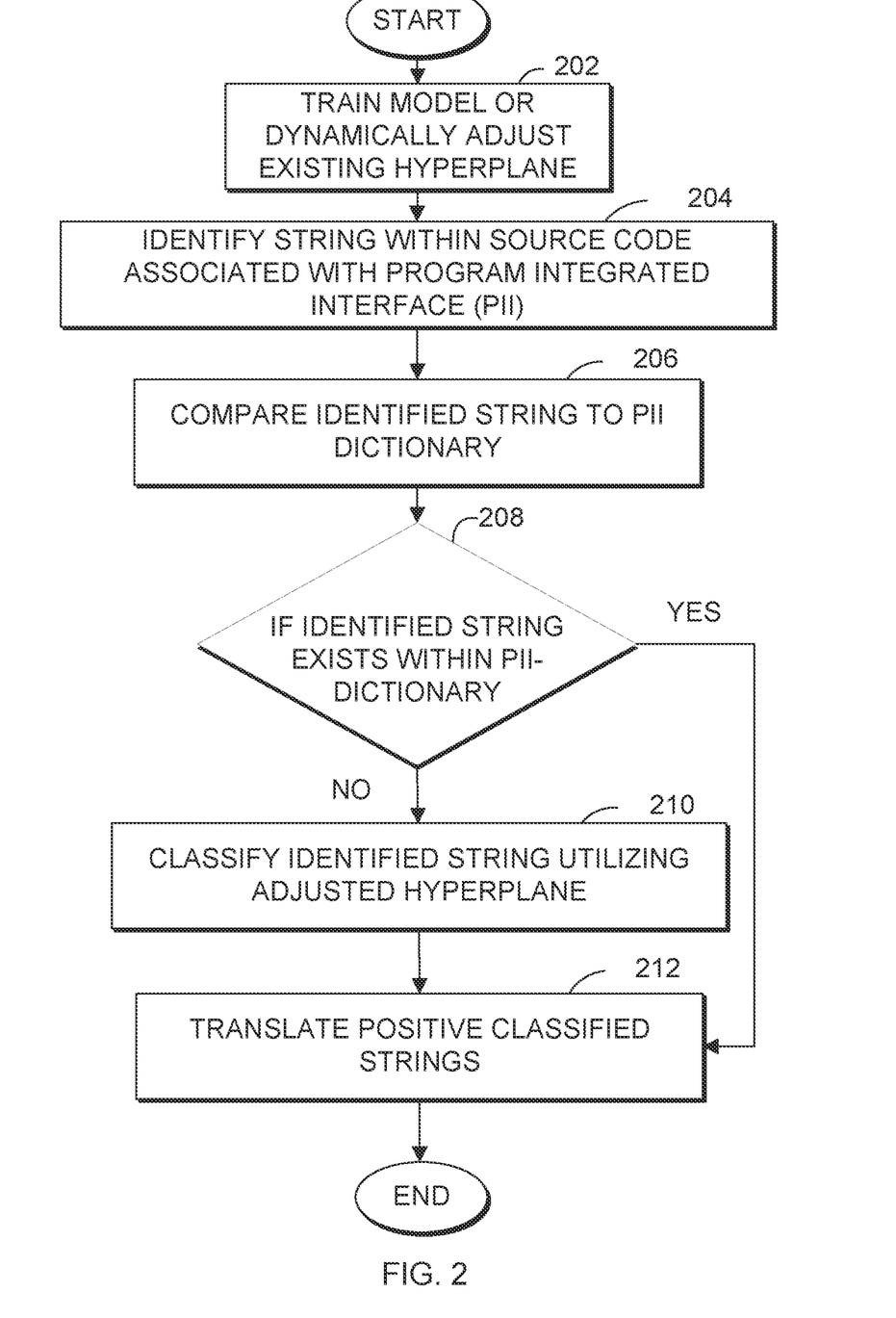
FIG. 2 is a flowchart depicting operational steps of a program, on a server computer within the computational environment of FIG. 1, for identifying translatable strings within program integrated interfaces, in accordance with an embodiment of the present invention.

FIG. 2 depicts flowchart 200 illustrating operational steps of program 150 for identifying translatable strings within program integrated interfaces, in accordance with an embodiment of the present invention.

Program 150 trains a model or dynamically adjusts an existing hyperplane (step 202). Program 150 utilizes an "unlimited" search to identify an optimal C value (i.e., margin value) that avoids overfitting (e.g., C is too high) and underfitting (e.g., C is too low) while improving model accuracy, wherein the optimal C allows for the highest model (i.e., model 152) accuracy when $C=x^n (x \in \mathbb{N}, n \in \mathbb{Z})$. Traditionally, binary search only identifies values within a minimum and maximum values, contrastingly the present invention is able to find values outside of minimum and maximum values. In addition, traditionally, exponential search only identifies positive values of n, contrastingly the present invention is able to find negative value of n. Further, exponential search can only identify positive n values by using $2^n (n \in \mathbb{N})$, contrastingly the present invention identifies both positive and negative values of n by using $x^n (n \in \mathbb{Z})$.

The procedure for "unlimited" search is detailed as follows. Program 150 initializes a plurality of model 152 (e.g., 5 models), where each model 152 is trained with a respective unique set of training data derived from a shuffled and partitioned training set. Initially, program 150 trains a plurality of model 152 (e.g., support vector machine (SVM)) with encoded positive data (i.e., historical translatable strings) and encoded negative data (i.e., historical false positive strings), each with associated properties such as XLIFF. According to embodiments of the invention, any existing machine learning techniques, algorithm, or models may be used for the training of each model 152, such as deep learning methods, supervised, semi-supervised, or unsupervised. Training, in a deep learning method is the phase in which the network tries to learn from the data. In an embodiment, program 150 partitions training data into one or more training subsets comprising 70% of the training data and a shared testing set comprising the remaining 30%.

Program 150 applies the steps and model tests described in this paragraph to each model 152 in the plurality of model 152, where each model is tested with the same testing set in order to determine how each model performs when used to make predictions on data not used during the training of the model. In an embodiment, program 150, initially, sets N=[-1,0,1]. Program 150 identifies a model 152 with a highest accuracy when $C=x^n$. If $|n| \geq 1$ then program 150 sets a=n, b=2n, N=[a, b], else program 150 sets n=0 and outputs or selects a model 152 with a highest accuracy when $C=x^0$. If $|a-b|>2$, program 150 selects a model 152 with a highest accuracy when n of N. In an embodiment, program 150 repeats the if-statements comprising $|n| \geq 1$ and $|a-b|>2$, as described above, until $|a-b| \leq 2$ and, responsively, program 150 breaks the loop. If $|a-b|>2$, program 150 sets C=[a, a+1, b], and responsively selects a model 152 with a highest accuracy when n of N. In an embodiment, program 150 utilizes the selected model to perform string classifications, as described in step 210. In an embodiment, responsively, program 150 adjusts an existing hyperplane, for example the hyperplane of step 210, utilizing the values identified in this step (e.g., C and n).

In an example, a user initially selects and sets x=10 correspondingly program 150 sets $C=10^n$ and N=(-1,0,1), $n \in \mathbb{N}$. Program 150 initiates "unlimited" search as described above: program 150 tests a plurality of models with N=(-1,0,1) and selects a model with the best accuracy when n=1, $C=10^1$; program 150 tests a plurality of models with N=(1,2) selects a model with the best accuracy when n=2, $C=10^2$; program 150 tests a plurality of models with N=(2,4) and selects a model with the best accuracy when n=2, $C=10^4$; program 150 tests a plurality of models with N=[4,8] and selects a model with the best accuracy when n=8, $C=10^8$; program 150 tests a plurality of models with N=(8,16) and selects a model with the best accuracy when n=16, $C=10^{16}$; program 150 tests a plurality of models with N=(16,32) and selects a model with the best accuracy when n=32, $C=10^{32}$; and program 150 selects a model with the best accuracy when n of N=(8,16) or N=(16,32). Responsively, program 150 repeats the steps above but with N=(8,16) resulting in a best model accuracy when n=16, $C=10^{16}$, thus program 150 sets N=(12,16). Responsively, program 150 sets N=(12,16) resulting in a best model accuracy when n=16, $C=10^{16}$, then program 150 sets N=(14,15,16) resulting in a best model accuracy when n=16, $C=10^{16}$. Program 150 identifies 16 as the optimal value in the set and responsively tests with N=(16,24) resulting in a best model accuracy when n=16, $C=10^{16}$. Program 150 then tests with N=(16,20) resulting in a best model accuracy when n=16, $C=10^{16}$ and, finally, program 150 tests with N=(16,17,18) resulting in a best model accuracy when n=17, $C=10^{17}$. Responsively, program 150 identifies 17 as the optimal n and selects and/or adjusts the model (e.g., hyperplane) utilizing $C=10^{17}$.

Program 150 identifies one or more strings within source code associated with a program integrated interface (step 204). In an embodiment, program 150 initiates responsive to a received or inputted program integrated interface (PII) such as a translatable graphic user interface (GUI) associated with an application suite. In another embodiment, program 150 initiates responsive to a new software build or pushed source code into a repository. In an embodiment, program 150 utilizes a parser to scan source code to extract all contained string data although the classification (i.e., translatable or non-translatable) of the extracted strings are unknown. In most embodiments, the majority of extracted strings are not GUI translatable leading to possible high rates (e.g., >80%) of false positives.

Program 150 compares identified strings to PII-Dictionary (step 206). In an embodiment, program 150 classifies each identified string utilizing a two phase process comprising a static code scan (step 206) and/or hyperplane classification (step 210). In an embodiment, program 150 processes each identified string through a static code scan that utilizes prebuilt rules to classify and filter translatable strings (e.g., positive classifications). For example, program 150 utilizes a prebuilt rule dictating that any quoted or double quoted string within any printf call is to be classified as translatable. In an embodiment, program 150 compares each identified string to historical strings contained within PII-Dictionary 122. If program 150 matches an identified string to a matching entry within PII-Dictionary 122 ("yes" branch, decision block 208), then program 150 classifies the identified string as positive (i.e., translatable or "hard-coded") or negative (i.e., non-translatable) depending on the classification of the matching entry and translates positive classified strings (step 212).

If program 150 does not match an identified string to a matching entry within PII-Dictionary 122 ("no" branch, decision block 208), then program 150 vectorizes or encodes the identified string and, responsively, program 150 hyperplane classifies the identified string (step 210). In an embodiment, program 150 utilizes trained, selected, and/or adjusted model 152, as described in step 202, to compute and classify the identified string, where identified string is vectorized or encoded. In this embodiment, program 150 initiates a model 152 (i.e., hyperplane classification) judgement responsive to a failed or inaccurate static judgement based on historical strings appearances (exactly matched) before judgement in vector space (hyperplane classification). In an embodiment, program 150 determines subsequent identified string classifications based on computed perpendicular distance between a hyperplane to targeted string to classify, wherein the classification is based on the shortest distance between the hyperplane and the target and one or more historical strings. In an embodiment, program 150 encodes and/or vectorizes the identified strings responsive to a negative classification from one or more prebuilt rules discussed above. In this embodiment, program 150 classifies the encoded and/or vectorized strings with a hyperplane classification model and historically classified strings. In this embodiment, program 150 utilizes the hyperplane classification to further classify and filter potential false positive strings. The hyperplane classification phase improves accuracy in identifying the translatable strings.

Program 150 translates positive classified strings (step 212). In an embodiment, program 150 utilizes the trained and adjusted model from step 202 to classify unknown strings for translatability (i.e., "hardcoded" string). Responsive to any string classified as positive (i.e., "hardcoded"), program 150 translates the content within the string to a specific language according to locality parameters or user location. In an embodiment, program 150 translates the string within an associated location within the source code. In another embodiment, program 150 translates the string and creates a mask to present the translated hardcoded string over a corresponding string presentation location in GUI or PII. In an embodiment, program 150 translates and presents "hardcoded" string content as a user interacts with an associated GUI or PII. In an embodiment, program 150 generates a report detailing all classified positive strings and corresponding locations on an associated GUI or PII, where the report is a digital document. In this embodiment, the reports details all identified "hardcoded" strings and corresponding presentation locations in the associated GUI or PII. In an embodiment, program 150 modifies model 152 prediction results by allowing modifications to PII-Dictionary 122.

Figure 3:
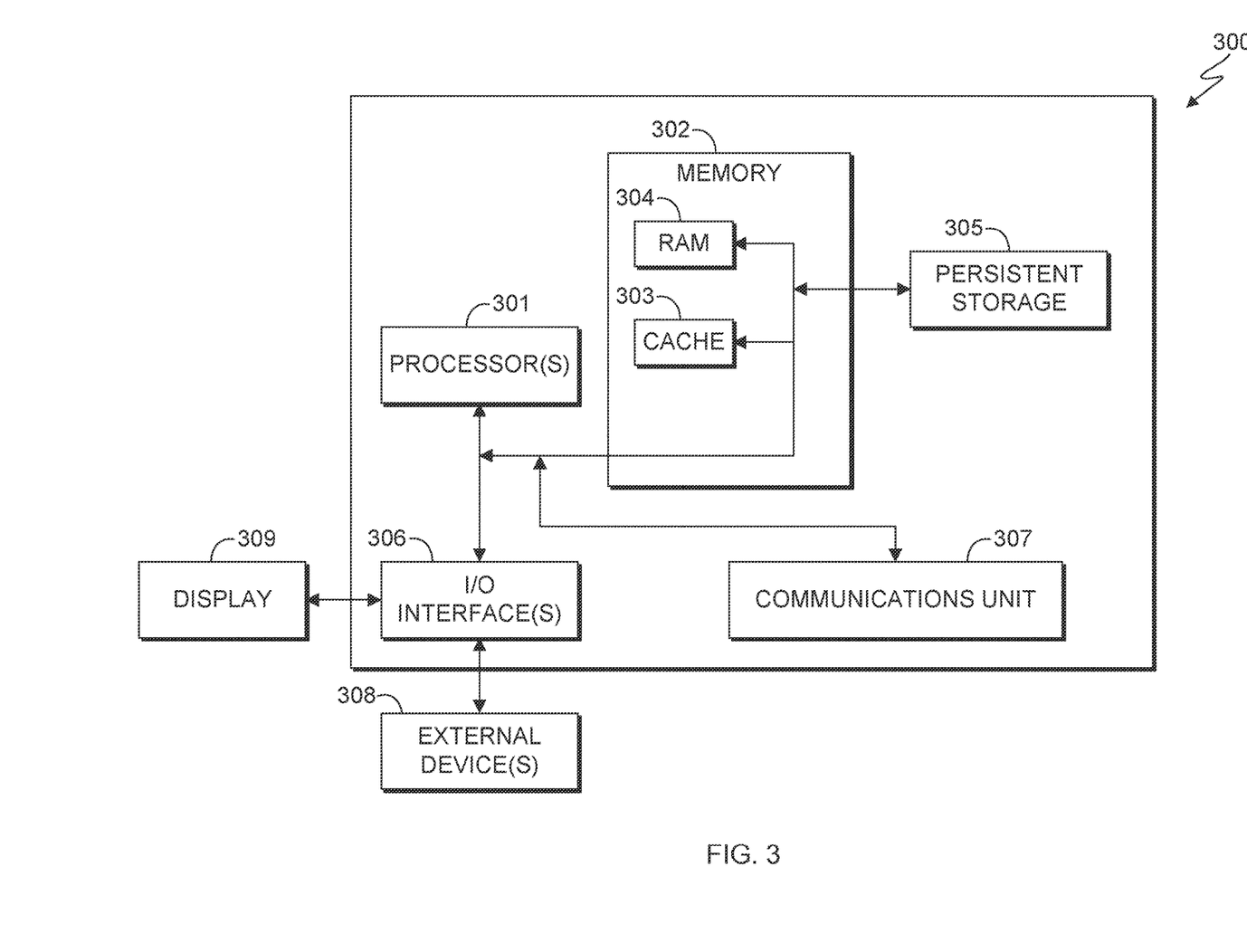
FIG. 3 is a block diagram of components of the server computer, in accordance with an embodiment of the present invention.

FIG. 3 depicts block diagram 300 illustrating components of server computer 120 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server computer 120 each include communications fabric 304, which provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications, and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of computer processor(s) 301 by holding recently accessed data, and data near accessed data, from memory 302.

Program 150 may be stored in persistent storage 305 and in memory 302 for execution by one or more of the respective computer processor(s) 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data can be stored in persistent storage 305 for access and/or execution by one or more of the respective processors 301 via cache 303.

Communications unit 307, in these examples, provides for communications with other data processing systems or devices. In these examples, communications unit 307 includes one or more network interface cards. Communications unit 307 may provide communications through the use of either or both physical and wireless communications links. Program 150 may be downloaded to persistent storage 305 through communications unit 307.

I/O interface(s) 306 allows for input and output of data with other devices that may be connected to server computer 120. For example, I/O interface(s) 306 may provide a connection to external device(s) 308, such as a keyboard, a keypad, a touch screen, and/or some other suitable input device. External devices 308 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 305 via I/O interface(s) 306. I/O interface(s) 306 also connect to a display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   identifying, by one or more computer processors, a string within source code associated with a program integrated interface (PII);
   comparing, by one or more computer processors, the identified string to a string entry comprised in a PII dictionary;

responsive to a match between the identified string and the string entry in the PII dictionary, classifying, by one or more computer processors, the identified string as translatable or non-translatable based on a classification associated with the string entry;

responsive to a non-match between the identified string and the string entry in the PII dictionary, classifying, by one or more computer processors, the identified string as translatable or non-translatable utilizing a hyperplane model trained with a margin (C) derived from unlimited search; and responsive to a classified translatable string, translating, by one or more computer processors, the classified translatable string.

2. The computer-implemented method of claim 1, wherein, comprises:

training, by one or more computer processors, a plurality of hyperplane models, wherein each hyperplane model in the plurality of hyperplane models is trained with a unique subset of a training set; and selecting, by one or more computer processors, a highest accuracy hyperplane model from the plurality of hyperplane models when $C=x^n$, wherein x is a user selected value.

3. The computer-implemented method of claim 1, wherein identifying the string within the source code associated with the PII is responsive to the source code pushed to a repository.

4. The computer-implemented method of claim 1, further comprising:

creating, by one or more computer processors, a mask to present the translated string over a corresponding string presentation location in the PII.

5. The computer-implemented method of claim 1, wherein the PII dictionary comprises historical strings and classifications.

6. The computer-implemented method of claim 1, further comprising:

generating, by one or more computer processors, a report detailing all hardcoded strings.

7. The computer-implemented method of claim 1, wherein the hyperplane model is a support vector machine.

8. A computer program product comprising:

one or more computer readable storage media and program instructions stored on the one or more computer readable storage media, the stored program instructions comprising:

program instructions to identify a string within source code associated with a program integrated interface (PII);

program instructions to compare the identified string to a string entry comprised in a PII dictionary;

program instructions to responsive to a match between the identified string and the string entry in the PII dictionary, classify the identified string as translatable or non-translatable based on a classification associated with the string entry;

program instructions to responsive to a non-match between the identified string and the string entry in the PII dictionary, classify the identified string as translatable or non-translatable utilizing a hyperplane model trained with a margin (C) derived from unlimited search; and program instructions to responsive to a classified translatable string, translate the classified translatable string.

9. The computer program product of claim 8, wherein the program instructions to unlimited search comprise:

program instructions to train a plurality of hyperplane models, wherein each hyperplane model in the plurality of hyperplane models is trained with a unique subset of a training set; and program instructions to select a highest accuracy hyperplane model from the plurality of hyperplane models when $C=x^n$, wherein x is a user selected value.

10. The computer program product of claim 8, wherein identifying the string within the source code associated with the PII is responsive to the source code pushed to a repository.

11. The computer program product of claim 8, wherein the program instructions, stored on the one or more computer readable storage media, further comprise:

program instructions to create a mask to present the translated string over a corresponding string presentation location in the PII.

12. The computer program product of claim 8, wherein the PII dictionary comprises historical strings and classifications.

13. The computer program product of claim 8, wherein the program instructions, stored on the one or more computer readable storage media, further comprise:

program instructions to generate a report detailing all hardcoded strings.

14. The computer program product of claim 8, wherein the hyperplane model is a support vector machine.

15. A computer system comprising:

one or more computer processors;

one or more computer readable storage media; and program instructions stored on the computer readable storage media for execution by at least one of the one or more processors, the stored program instructions comprising:

program instructions to identify a string within source code associated with a program integrated interface (PII);

program instructions to compare the identified string to a string entry comprised in a PII dictionary;

program instructions to responsive to a match between the identified string and the string entry in the PII dictionary, classify the identified string as translatable or non-translatable based on a classification associated with the string entry;

program instructions to responsive to a non-match between the identified string and the string entry in the PII dictionary, classify the identified string as translatable or non-translatable utilizing a hyperplane model trained with a margin (C) derived from unlimited search; and program instructions to responsive to a classified translatable string, translate the classified translatable string.

16. The computer system of claim 15, wherein the program instructions to unlimited search comprise:

program instructions to train a plurality of hyperplane models, wherein each hyperplane model in the plurality of hyperplane models is trained with a unique subset of a training set; and program instructions to select a highest accuracy hyperplane model from the plurality of hyperplane models when $C=x^n$, wherein x is a user selected value.

17. The computer system of claim 15, wherein identifying the string within the source code associated with the PII is responsive to the source code pushed to a repository.

18. The computer system of claim 15, wherein the program instructions, stored on the one or more computer readable storage media, further comprise:

program instructions to create a mask to present the translated string over a corresponding string presentation location in the PII.

19. The computer system of claim 15, wherein the PII dictionary comprises historical strings and classifications.

20. The computer system of claim 15, wherein the program instructions, stored on the one or more computer readable storage media, further comprise:

program instructions to generate a report detailing all hardcoded strings.

\* \* \* \* \*